United States Patent [19]

Johansson

[11] Patent Number: 5,002,726
[45] Date of Patent: Mar. 26, 1991

[54] NUCLEAR FUEL ASSEMBLY SPACER AND LOOP SPRING WITH ENHANCED FLEXIBILITY

[75] Inventor: Eric B. Johansson, San Jose, Calif.

[73] Assignee: General Electric Company, San Jose, Calif.

[21] Appl. No.: 457,447

[22] Filed: Dec. 27, 1989

[51] Int. Cl.⁵ .................................................. G21C 3/32
[52] U.S. Cl. ..................................... 376/448; 376/444
[58] Field of Search ................................. 376/444, 448

[56] References Cited

U.S. PATENT DOCUMENTS

| | | | |
|---|---|---|---|
| 4,448,745 | 5/1984 | Anthony | 376/448 |
| 4,508,679 | 4/1985 | Matzner | 376/438 |
| 4,544,522 | 10/1985 | Curulla | 376/441 |
| 4,946,587 | 8/1990 | Reeves et al. | 209/539 |

FOREIGN PATENT DOCUMENTS 62-38392  2/1987  Japan .
1121793  11/1987  Japan .

Primary Examiner—Donald P. Walsh
Assistant Examiner—Meena Chelliah
Attorney, Agent, or Firm—Robert R. Schroeder

[57] ABSTRACT

A spring-and-spacer assembly for maintaining fuel rods upright in a fuel assembly of a nuclear reactor core is provided. The spring is in the form of a continuous loop with first and second legs having mid-leg rod-contact regions. Bend regions are positioned on each side of each contact region extending toward the interior of the loop spring. In most positions, the spring is used to load two adjacent fuel rods. In configurations in which there is an unpaired fuel rod, a plate having a tab for contacting the spring is provided. The spring provides the desired force, such as about 2.5 pounds per fuel rod, in a small rod-to-rod spacing of less than about 0.14 inches.

5 Claims, 6 Drawing Sheets

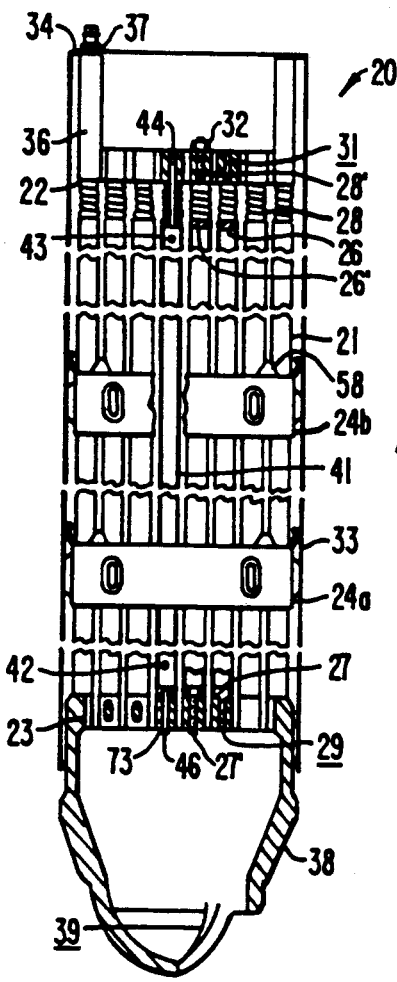
FIG._1. PRIOR ART
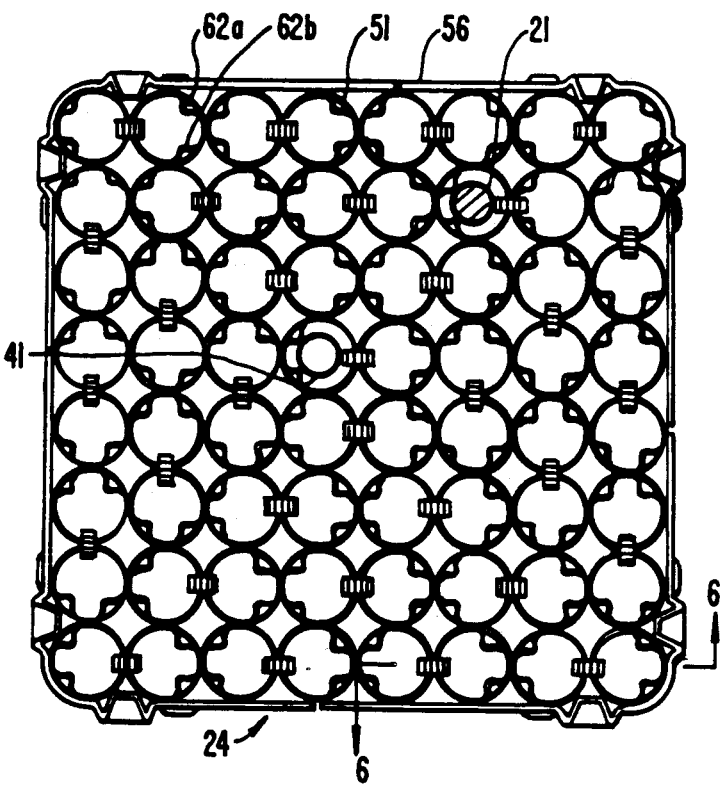
FIG._2. PRIOR ART
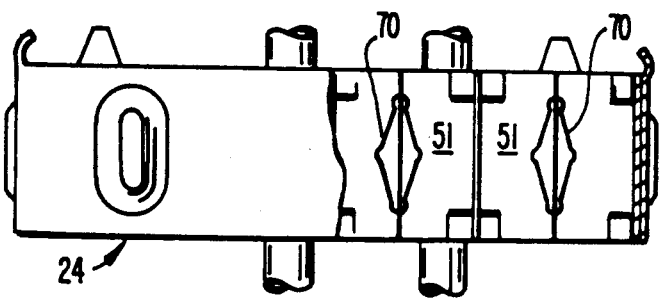
FIG._3. PRIOR ART
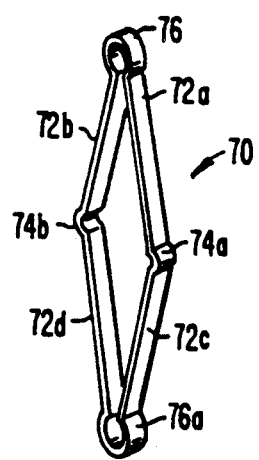
FIG._4. PRIOR ART

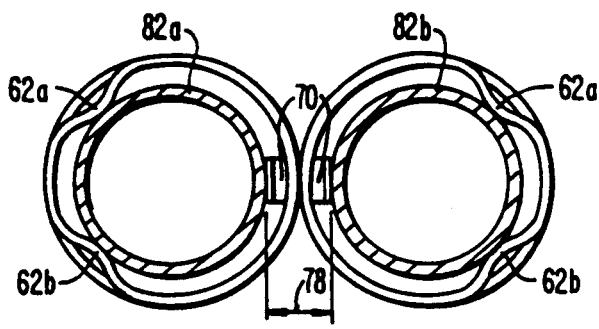
FIG._5. PRIOR ART
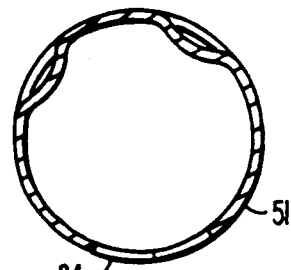
FIG._8. PRIOR ART
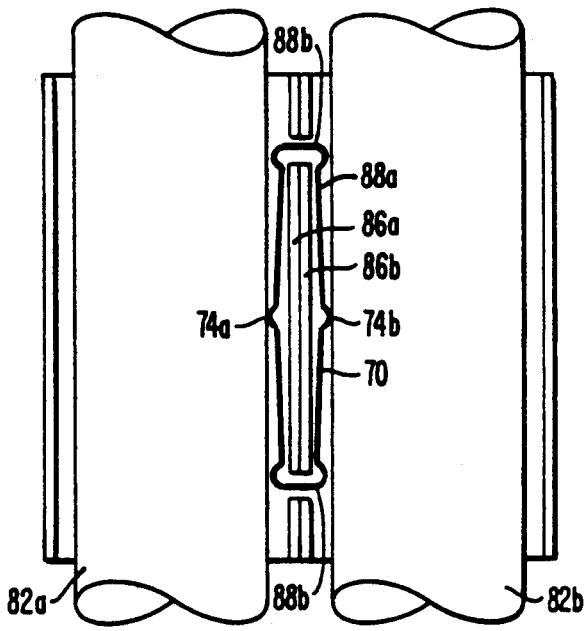
FIG._6. PRIOR ART
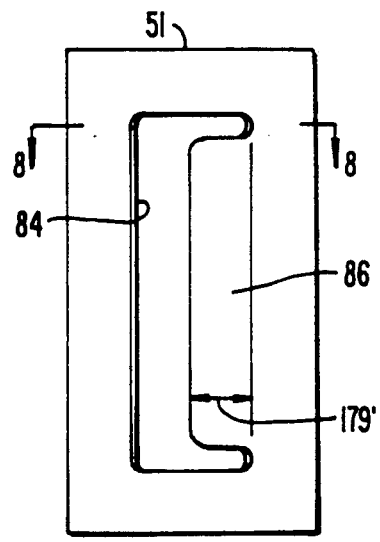
FIG._7. PRIOR ART
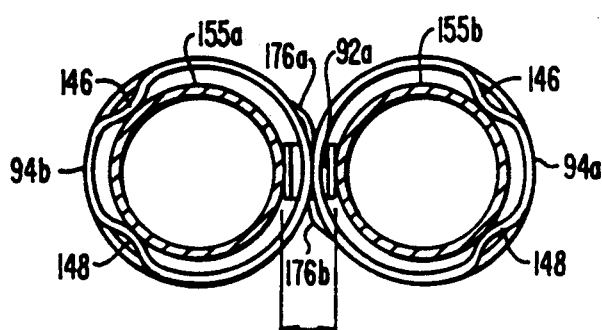
FIG._10.
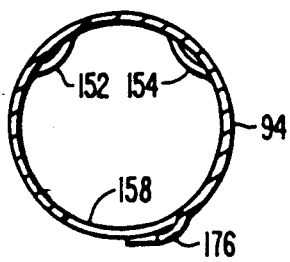
FIG._13.

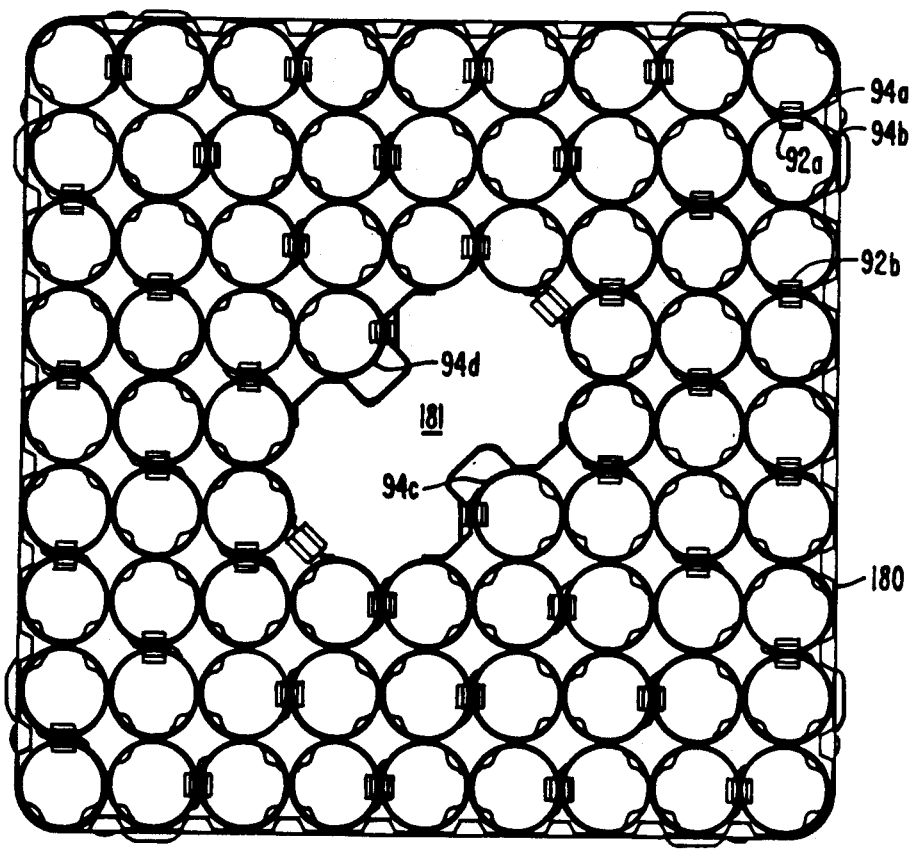
FIG._9.
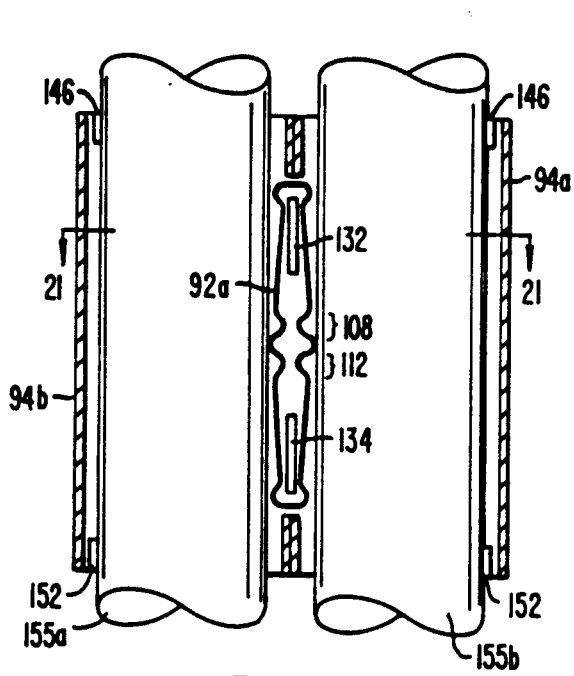
FIG._11.
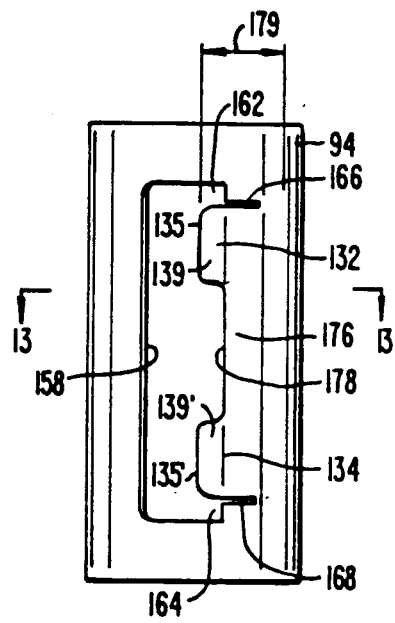
FIG._12.

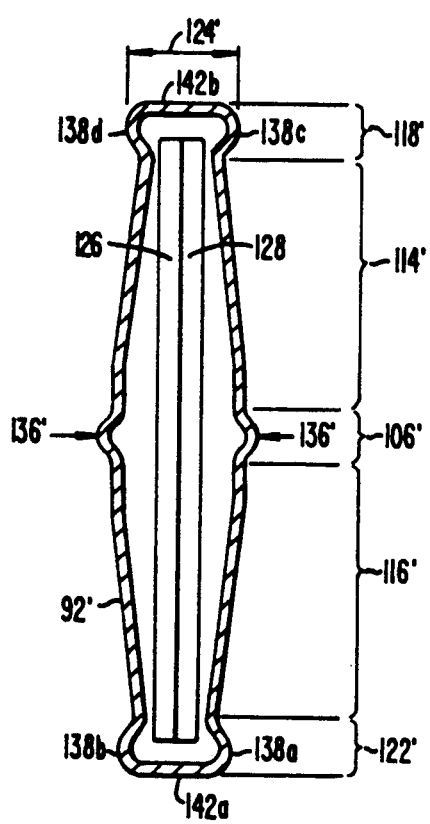
PRIOR ART FIG.\_14.
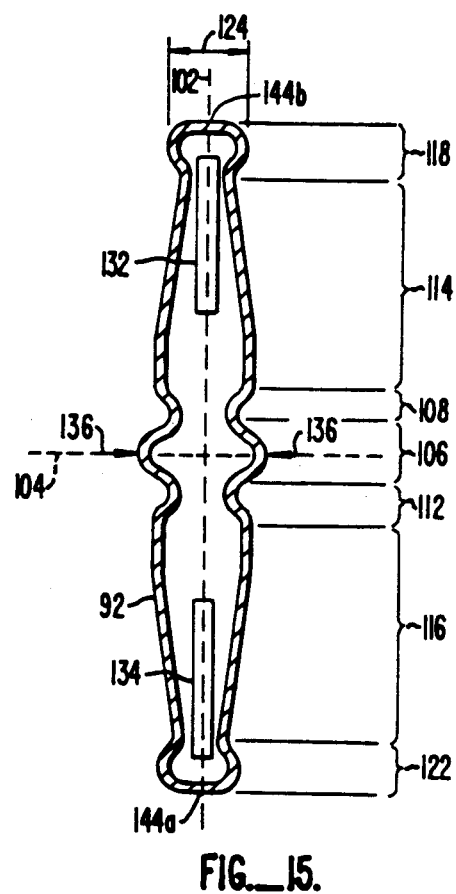
FIG.\_15.
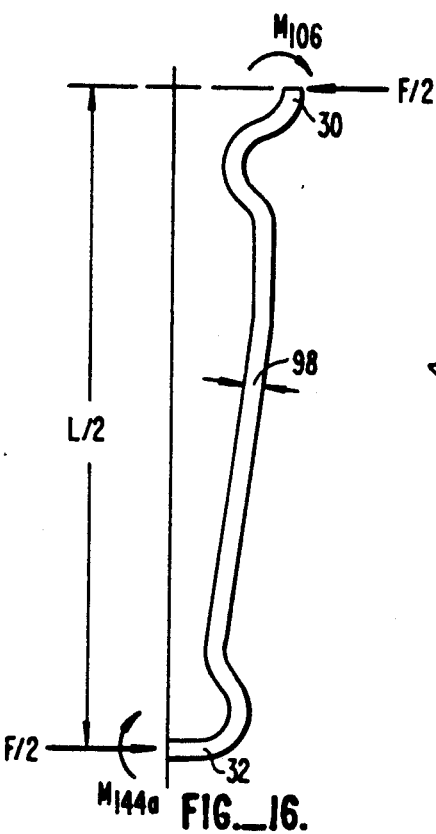
FIG.\_16.
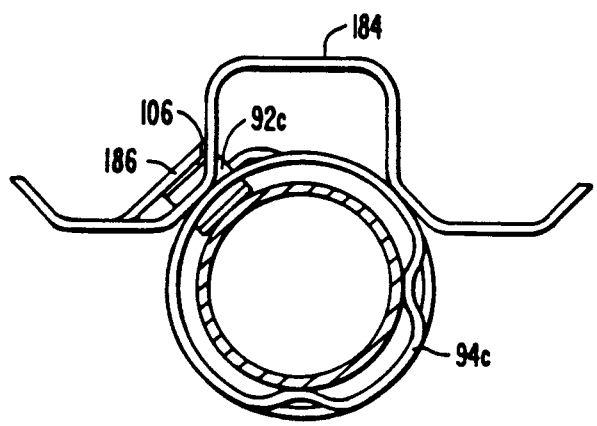
FIG.\_18.

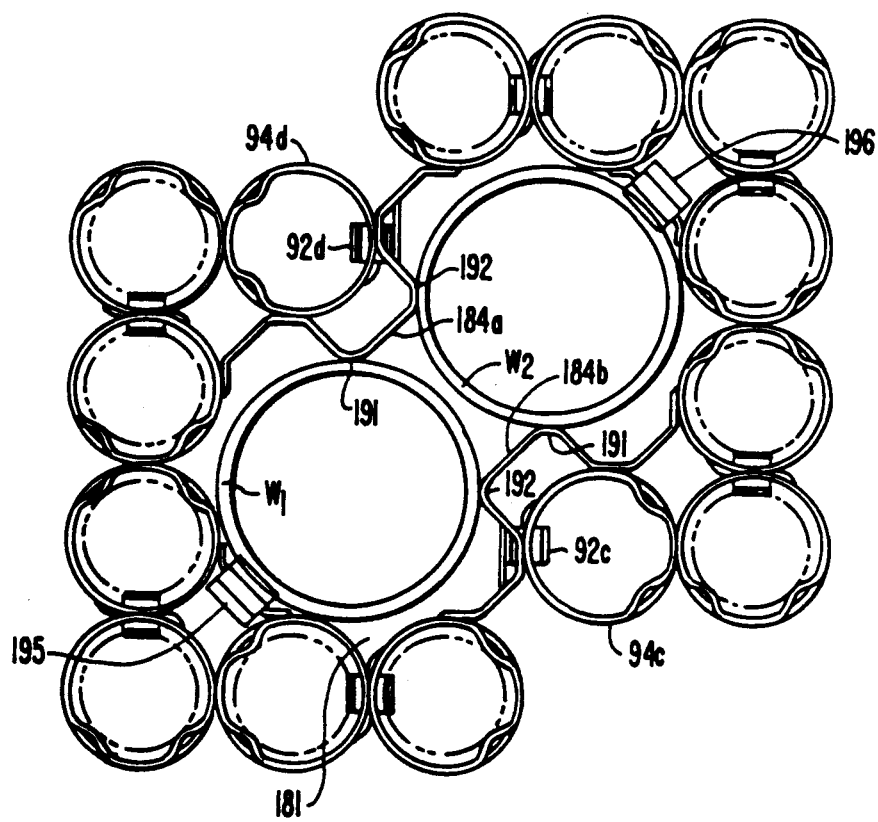
FIG._17.
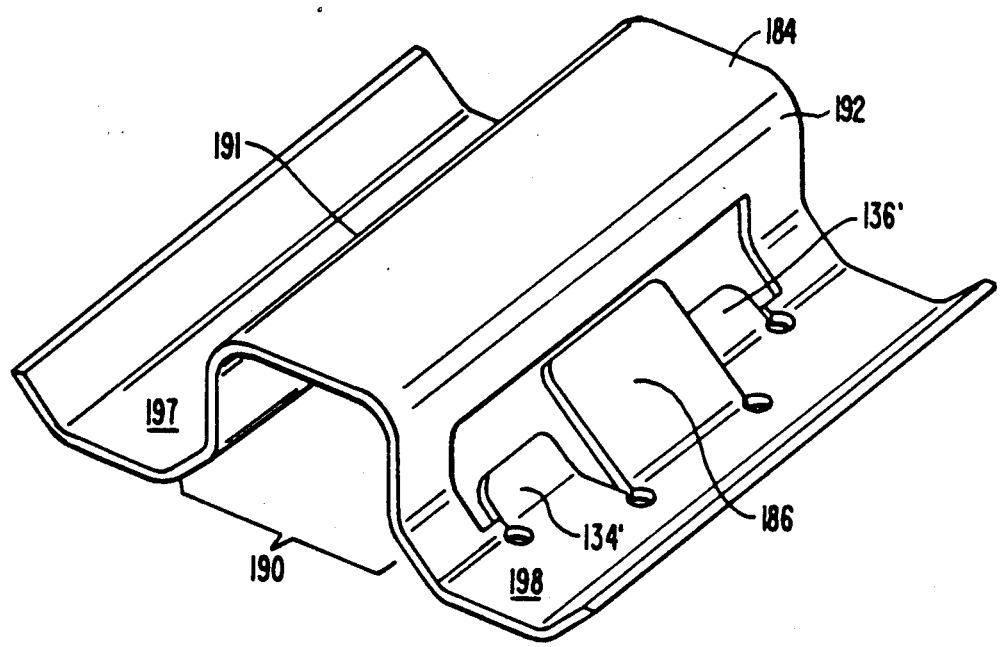
FIG._19.

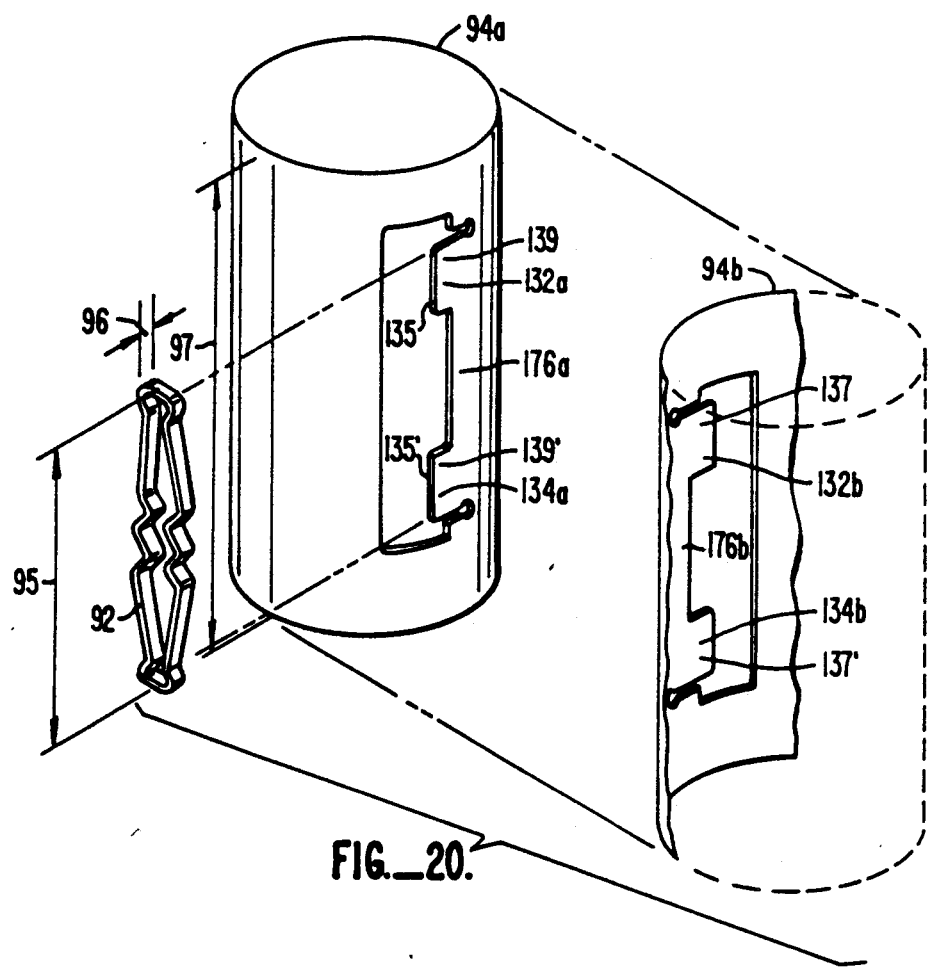
FIG._20.
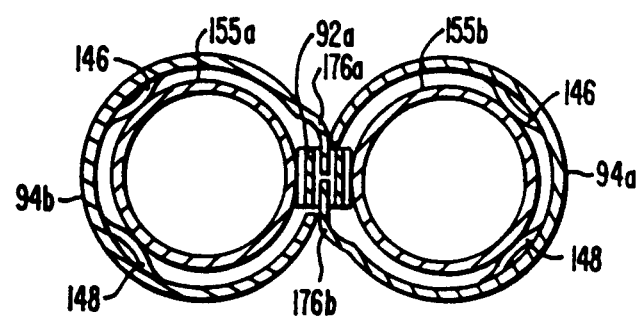
FIG._21.

NUCLEAR FUEL ASSEMBLY SPACER AND LOOP SPRING WITH ENHANCED FLEXIBILITY

FIELD OF THE INVENTION

The present invention relates to a spacer usable for positioning fuel rods and water rods in a nuclear fuel assembly and springs therefor, and, in particular, to springs that occupy reduced space in such spacers.

BACKGROUND OF THE INVENTION

In a known type of nuclear power reactor, for example, a boiling-water reactor, nuclear fuel is provided in elongated rods. The nuclear fuel is typically in the form of uranium oxide and/or plutonium oxide pellets enclosed in zircaloy tubes. A number of such fuel rods are grouped together in an open-ended tubular flow channel. The flow channel with the fuel rods positioned therein is referred to as a "fuel assembly" or "bundle." A plurality of fuel assemblies are removably positioned in the reactor core in a matrix. The reactor core formed in this manner is capable of self-sustained fission reaction. The core is submerged in a fluid, such as light water, which serves both as a coolant and as a neutron moderator.

The fuel rods in a fuel assembly are supported between upper and lower tie plates. The fuel rods are typically arrayed in parallel side by side vertical upstanding relation. The fluid coolant flows past the fuel rods in the intersticies between the vertical and parallel fuel rods. To provide proper coolant flow and preserve integrity of the fuel rods, it is important to maintain the rods in a preferred spaced relationship and to restrain them from bowing and vibrating during reactor operation.

To maintain spaced apart alignment of its fuel rods, a plurality of fuel rod spacers spaced along the length of the fuel assembly are provided for this purpose. One type of spacer includes a plurality of generally cylindrical ferrule elements. An example of a spacer usable in a fuel assembly is that shown in U.S. Pat. No. 4,508,679, issued Apr. 2, 1989, to Matzner, et al.

As shown in Matzner, et al., one method of positioning a fuel rod within the ferrule elements of a spacer is to provide a spring member for biasing the fuel rod against rigid stops in the ferrules. The spring depicted in U.S. Pat. No. 4,508,679 is in the form of a continuous loop of generally elliptical shape. The springs are positioned in the volume of the spacer area between adjacent fuel rods.

Modern fuel bundle design typically includes fuel rods being arrayed in a square sectioned fuel bundle. The arrays originally where in a 7×7 matrix. This left relatively large spaces between the fuel rods. Accordingly, the problem of placing springs between the rod to maintain the rods in vertical upstanding relation presented a generally simple mechanical design problem.

Unfortunately, modern fuel bundle designs include much denser fuel rod arrays. Such arrays have gone from fuel rod matrices including 8×8 fuel rod arrays to 9×9 and 10×10 fuel rod arrays. This being the case, the interstitial volume (or thickness) between the fuel rods has shrunk. Although the same spring action is required for the most part from the springs acting with the spacers to maintain the fuel rods in vertical upstanding relation, the space in which such spring action can occur is vastly reduced. Previous fuel assemblies having 8×8 matrices fuel rods had been constructed with rod-to-rod spacings (i.e.. distances between outer circumferences of adjacent rods) of about 0.160 inches (about 4 mm). Modern fuel bundles are being designed with 9×9 matrices of fuel rods to have a reduced rod-to-rod spacing, such as about 0.12–0.14 inches (about 3 to about 3.5 mm). This reduction in fuel rod interstitial spacing has had severe constraints on the spring design.

It should be noted that the springs, although necessary for positioning the rods, can have certain undesirable effects. These undesirable effects include absorption of neutrons and interference with the coolant circulation. Materials from which the springs are typically formed absorb 20–100 times the number of neutrons absorbed by the spacer material. Accordingly, there is a high motive to maintain a minimum of spring material within the fuel bundle.

SUMMARY OF THE INVENTION

A spring system is provided for bracing side by side fuel rods in dense (9×9) arrays. The spring system is incorporated to the several spacers, typically 6, 7 or 8 positioned at vertically distributed intervals between the upper and lower tie plates in a square sectioned fuel bundle. The spacers and springs disclosed maintain a substantially uniform spacing between the vertically upstanding fuel rods and water rods contained with the fuel bundle. A loop spring is provided as the main fuel rod biasing unit. Like the prior art, the loop spring surrounds portions of the spacer and is thus held in a generally vertically disposed elongate loop by the spacer. Each loop spring acts on typically a pair of fuel rods, one rod being on each side of the spring. Each fuel rod is confined within its own discrete ferrule at the spacer and is spring biased by the spring against paired protuberances. Each loop spring includes upper and lower C-shaped end portions for retaining the spring to the spacer. In between each upper and lower C-shaped end portions there are formed two spring legs. The spring legs begin at the ends of each "C" and flare with gradual reversing curvature to substantially linear spring leg portions. Each spring leg includes in the center of the leg a convex and outwardly disposed arched shaped rod contacting portion for spring biased contact with the fuel rods on either side of the spring. Unlike the prior art, two inwardly disposed U-shaped bends are incorporated in each spring leg immediately on either side of the outwardly disposed arched shaped rod contacting portion. These two U-shaped bends extend the effective length of the spring material over which the spring forces can act and effectively evenly distribute the maximum bending forces on the spring material to the arched shaped rod contacting portion and the upper and lower C-shaped end portions. There results a spring which can provide a wide range of deflections while being confined to the narrow interstices between closely spaced and dense fuel rod arrays such as the 9×9 array disclosed.

The disclosed 9×9 matrix fuel bundle has the seven middle lattice positions occupied by two relatively large and circularly sectioned water rods. Seven central ferrules are removed to provide space for the water rods. Two ferrules adjacent to the water rods are not paired with another ferrule, so that the spring in each of these ferrules acts on only one fuel rod. A special method for mounting these springs is required.

A water rod spacer plate is disclosed. This plate has two functions. First, it provides the required mounting for the disclosed loop springs in the locations where the spring bears on one rod only. Second, the water rod spacer plate provides stops for the water rods.

The water rod spacer plate has a U-shaped central region for bearing against the two water rods at their adjoining exterior surfaces. One lower portion of the "U" bears against one water rod; the other lower portion of the "U" bears against the other water rod. These contact regions provide stops for the water rods. A spring mounted on a separate plate biases each water rod toward these stops.

The water rod spacer plate has a wing at each end of the U-shaped central region. One of these wings is shaped to provide mounting means for the springs which bear against only one fuel rod.

Because of the intervention of the water rods, at least one spring must be provided with a fuel rod on one side only. This spring is conveniently mounted on a disclosed interlock between a tab protruding from the specially constructed fuel rod ferrule and a mating tab on the "U" sectioned water rod spacer member. Accordingly, required bias is supplied against all spaced apart vertical fuel rods and water rods of the dense 9×9 matrix fuel bundle.

BRIEF DESCRIPTION OF THE DRAWINGS

FIG. 1 is a broken-away partial elevational view, partly in section, of a nuclear fuel bundle;

FIG. 2 is a plan view of a prior art previous fuel rod spacer;

FIG. 3 is an elevation view, partly in section, of the spacer of FIG. 2;

FIG. 4 is a perspective view of a loop spring provided in prior art spacers;

FIG. 5 is a top plan view of two adjacent ferrules and an intervening spring of prior art devices;

FIG. 6 is a front elevational view of the ferrules of FIG. 5, partly in cross section;

FIG. 7 is an elevational view of a ferrule provided in prior art devices;

FIG. 8 is a cross-sectional view of a ferrule taken along line 8—8 of FIG. 7;

FIG. 9 is a top plan view of a spacer according to the present invention;

FIG. 10 is a top plan view of two adjacent ferrules and the associated spring according to the present invention;

FIG. 11 is an elevational view, partly in cross section, of the ferrules and spring of FIG. 10;

FIG. 12 is an elevational view of a ferrule according to the present invention;

FIG. 13 is a cross-sectional view taken along line 13—13 of FIG. 12;

FIG. 14 is a detailed view of a prior art spring mounted on a ferrule tab;

FIG. 15 depicts the spring of the present invention mounted on the ferrule ears;

FIG. 16 depicts the lower right quadrant of one spring according to the present invention, depicting certain forces thereon;

FIG. 17 is a partial top plan view of the spacer of the present invention;

FIG. 18 is a detailed top plan view of an unpaired ferrule of a spacer and the associated support plate;

FIG. 19 is a perspective view of a backup plate usable in connection with the present invention;

FIG. 20 is a partial exploded view of two adjacent ferrules and an associated spring; and FIG. 21 is a cross-sectional view taken along line 21—21 of FIG. 11.

DETAILED DESCRIPTION OF THE PREFERRED EMBODIMENT

The spring-and-spacer assembly of the present invention is provided for use in connection with a fuel assembly, such as that depicted in FIG. 1. The fuel assembly 20 includes a plurality of fuel elements or rods 21, supported between an upper tie plate 22 and a lower tie plate 23. The fuel rods 21 pass through a plurality of fuel rod spacers 24a, 24b, which provide intermediate support to retain the elongated rods 21 in spaced relation and to restrain them from lateral vibration. In one embodiment, seven spacers are longitudinally evenly spaced along the fuel assembly.

Typically, the fuel bundle is in the order of eleven feet in length. The matrix of fuel rods and water rods is in the order of 5 inches×5 inches. Typically, and in order to maintain the proper linearity between the fuel rods, water rods, and surrounding channel there are seven equally spaced spacers between the lower tie plate at the bottom and the upper tie plate at the top.

Each of the fuel rods 21 is formed of an elongated tubular cladding material containing fissile fuel and other materials, such as burnable nuclear poison, inert material, or the like. The fuel and other materials are sealed in the tube by upper and lower end plugs 26, 27. The lower end plugs 27 are registered and positioned in cavities 29 formed in the lower tie plate 23. Similarly, the upper end plugs 26 fit into cavities 31 in the upper tie plate 22.

Some of the fuel rods 21 may be provided with threaded lower and upper end plug extensions 27', 28' to receive retaining nuts 32. These fuel rods are known as "tie rods." In this manner, the upper and lower tie plates and fuel rods are formed into a unitary structure.

Typically, the fuel rod assembly includes a channel 33 of substantially square cross section sized to form a sliding fit over the upper and lower tie plates 22 and 23 and the spacers 24, so that the channel 33 may readily be remounted and removed. The channel 33 is fastened to a post 36 on the upper tie plate 22 by means of a bolt 37 passing through a tab 34. The lower tie plate 23 includes a nose piece 38 adapted to support the fuel assembly 20 in a socket in a core support plate (not shown) in the reactor pressure vessel. The end of the nose piece is formed with openings 39 to receive the pressurized coolant so that it can flow upwardly among the fuel rods.

One or more of the fuel rods 21 may be replaced by a moderator tube or water rod 41 which contains water, a neutron moderator. The moderator tube 41 may be apertured, as shown at 42 and 43, and the upper and lower end plugs may be formed with passages 44, 46 to permit flow of water moderator therethrough.

An understanding of the present invention is promoted by a brief description of the spacer and spring apparatus of previous devices. A prior art spacer 24, as depicted in FIGS. 2 and 3, is made up of a plurality of substantially cylindrical ferrules 51 joined to one another, for example by welding, at the upper and lower edges of abutting portions of adjacent ferrules. Each of the ferrules 51 provides a space for a fuel rod 21 or moderator tube 41.

Preferably, each of the ferrules 51 is formed of a short section of tubing having circular cross section. A peripheral band 56 surrounds and supports the plurality of ferrules 51. Two stops 62a, 62b are provided in each ferrule. Preferably, the stops 62a, 62b are formed integrally with the ferrule 51 as laterally spaced pairs of arched portions of the ferrule walls near the upper and lower edges of the ferrule.

Preferably, the stops 62a, 62b are laterally oriented to minimize spacer projected area and coolant-flow resistance. As best seen in FIG. 3, each pair of ferrules 51 shares a continuous loop spring 70. As depicted in FIG. 4, the continuous loop spring 70, used in previous devices, includes first, second, third, and fourth legs 72a, 72b, 72c, 72d joined by mid-positioned ridges or convex arcuate spring contacting portions 74a, 74b and end-positioned arches or C-shaped portions 76a, 76b. The springs 70, depicted in FIG. 3, are in their substantially unstressed or unflexed condition. The springs in the flexed or stressed condition are depicted in FIGS. 5 and 6.

In the previous devices, depicted in FIGS. 5 and 6, the springs 70 occupy a region between two adjacent fuel rods. In previous devices, the rod-to-rod spacing 78 was approximately 0.16 inches (about 4 mm). As seen in FIG. 6, the previous spring 70 contacted the fuel rods 82a, 82b at the ridge portion 74a, 74b, and provided a force tending to position the fuel rods 82a, 82b against the stops 62a, 62b of each ferrule.

Each ferrule 51 was provided with a C-shaped slot 84, defining a tab 86. In assembly, the spring 70 was inserted into the slot 84 and positioned over the tab 86. An adjacent ferrule was fitted to the initial ferrule, with the C-shaped slot of the second ferrule oriented with the tab 86 pointing in the opposite direction from the tab of the first ferrule. The tabs 86 of the first and second ferrules overlapped each other. The spring was then captured between the two ferrules, and formed a loop around the overlapped tabs 86.

A number of difficulties have been noted in connection with the previous spring-and-spacer assembly, particularly when such assembly is intended for use in connection with a fuel assembly having a reduced rod-to-rod spacing. The spring which is used in a spring-and-spacer assembly must provide the required amount of force, preferably about 2.5 pounds (about 1 kg), but must also have sufficient flexibility to tolerate deflection beyond that normally needed for positioning the fuel rod without substantial permanent deformation. Deflection of the spring beyond that normally needed for positioning the fuel rod can occur, for example, during shipping or assembly, particularly if the fuel rod 82 is encased, during assembly, in a protective plastic sheath (not shown). As shown in FIG. 6, the previous loop spring 70 could deflect only a limited distance before the interior surface of the spring 70 would strike the tab 86 of the ferrule. This limitation places close tolerances on the configuration of the spring 70, particularly when a smaller rod-to-rod spacing 78, such as about 0.12 to 0.14 inches (about 3 to 3.5 mm) is desired.

FIG. 9 depicts a spacer and the associated springs according to the present invention. The springs 92a and 92b are arranged such that a single spring 92a loads the fuel rods positioned in two adjacent ferrules 94a, 94b. The overall length 95 (FIG. 20) of the spring is less than the length 97 of the ferrules 94a, 94b.

FIGS. 10 and 11 depict a portion of a spacer and the associated springs according to the present invention. A spring 92a is formed of a metallic ribbon having a width 96 (FIG. 20) and a thickness 98 (FIG. 16). The spring can be formed of a number of materials having suitable strength, corrosion resistance, and resilience characteristics. In one preferred embodiment, the spring is formed of a nickel alloy, such as Inconel, available from Huntington Alloy Products Division, International Nickel Co., Inc., Huntington, W. Va. In the preferred embodiment, the width 96 is about 0.1 to about 0.15 inches (about 2.5 to 3.8 mm), and the thickness 98 is about 0.01 to 0.015 inches (about 0.25 to 0.38 mm). The ribbon is formed into a continuous loop, i.e., a shape with a cross section topologically equivalent to an annulus. Preferably, the spring has at least two planes of symmetry, a longitudinal mid-plane 102 and a lateral mid-plane 104 (FIG. 15). Thus, the spring has four congruent sectors, the lower-right sector being depicted in FIG. 16.

The longitudinal extent of the spring can be considered as having seven sections, as shown in FIG. 15. A ridge or arch-shaped rod-contacting portion 106 is formed in each leg, centered about the lateral symmetry plane 104 at the mid-span of each leg. Disposed on either side of the arch section 106 are U-shaped bend portions 108, 112 extending in a direction generally toward the longitudinal mid-plane 102. Upper and lower leg portions 114, 116 are positioned adjacent the bend portions 108, 112, respectively. C-shaped end portions 118, 122 are adjacent the leg portions 114, 116.

The U-shaped bend portions 108, 112 constitute the departure from the prior art which makes the disclosed spring design possible. Specifically, U-shaped bend portions 108, 112 are formed adjacent to each of the two arch-shaped rod-contacting regions 106. Viewed from the exterior of the spring, the bend portions 108, 112 are concave, i.e., they extend toward the interior of the loop spring. The bend portions 108, 112 are on the loop interior side of the planes defined by the adjacent, substantially planar upper and lower leg portions 114, 116.

These two U-shaped bend portions 108, 112 in each of the spring legs each provide two functions for the improved spring design. First, they provide additional spring length, which increases the flexibility of the spring.

Secondly, these same two U-shaped bend portions 108, 112 cause the maximum bending stress to be evenly distributed between the high stress regions of the spring.

A first region where the bending stress is high is the convex and outwardly disposed arch shaped rod contacting portion of the spring 106. This member has effective maximum compression forces acting on the outside of the spring member at this juncture and maximum tension forces acting on the inside of the spring member. A second region where the bending stress is high (and oppositely disposed) is in the upper and lower C-shaped members 118, 122. In these members the bending stress is the opposite with maximum tensile forces on the outside and maximum tension forces on the inside.

It will be understood that the disclosed design has the benefit of equalizing the bending stress in the respective two regions. This equalization of bending stress provides the maximum spring deflection.

The shape of the spring of the present invention 15 can be contrasted with that of the previous devices depicted in FIG. 14. The width 124' of the previous design was greater than the end portion width 124 of the present design. The previous design, shown in FIG. 14, did not include U-shaped portions 108, 112 adjacent to the rod-contacting region, so that the previous design spring had a rod-contacting portion 106' which was immediately adjacent to the substantially planar upper and lower leg portions 114', 116'. In the previous design, depicted in FIG. 14, the spring 92' encircled and accommodated a double thickness of the tabs 126, 128 formed in adjacent ferrules, since these were positioned in an overlapping configuration.

In contrast, in the present invention, only a single tab thickness 132 must be accommodated by a spring, since the tabs meet in a butt-joint fashion, as described more fully below.

Furthermore, the tabs 126, 128 of the previous design, depicted in FIG. 14, were longitudinally continuous. In the present design, depicted in FIG. 15, there is a space between the upper ear 132 and lower ear 134 formed, as described more fully below, by the middle leg 178 (FIG. 12) of an E-shaped cutout 158, which assists in accommodating the U-shaped bend portions 108, 112, particularly in the flexed position, as depicted in FIG. 11.

Both the previous spring design, depicted in FIG. 14, and the present spring design, depicted in FIG. 15, are loaded by forces 136', 136, respectively, where the springs 92', 92 contact the fuel rods. In the previous design, depicted in FIG. 14, some flexibility is provided by the arch-shaped projections in the rod-contacting region 106' and by the projections 138a, 138b, 138c, 138d, and horizontal portions 142a, 142b of the end regions 118', 122'. In the spring of the present invention, as depicted in FIG. 15, the bend portions 108, 112 provide increased flexibility, as compared to the prior art spring.

In addition to increasing the spring flexibility, the bend regions 108, 112 provide a more desirable stress distribution. In the spring of previous designs, depicted in FIG. 14, the largest stresses on the spring occur near the spring contact portion 106' and in the center of the end portions 142a, 142b. Finite element computer analysis of the previous spring designs of FIG. 14 shows that the stress at mid-span 106' is greater than the stress at the ends 142a, 142b. The ends 142a, 142b have greater local flexibility than the mid-span region 106'. This greater flexibility at the ends reduces the stress near the ends 142a, 142b, and increases the relative stress at mid-span 106'. Adding bends 108, 112 near the mid-span 106 provides greater local flexibility near the mid-span 106, which would be more nearly equal to the flexibility of the end regions 118, 122. This is supported by the results of a computer model analysis of the spring 92.

Because of the symmetry of the spring, noted above, it can be analyzed by considering one quarter of the spring, as depicted in FIG. 16. Stresses at the mid-span 106 and the end point 144a are proportional to bending moments. Equilibrium of bending moments can be expressed as $$M_{144a} + M_{106} = (F/2) \times (L/2) \quad (1)$$

where $M_{144a}$ is the bending moment at the lower end mid-point 144a, $M_{106}$ is the bending moment at mid-span 106, F is the total load on the spring, and L is the length of the spring. The relationship expressed in equation (1) is independent of the shape of the spring between the mid-span point 106 and end point 144a. It is desirable to provide a spring which has equal bending moments and equal stresses at these two points, 144a, 106. Finite element analysis confirms that stresses at mid-span 106 and the end point 144a are nearly equal for the new spring depicted in FIGS. 15 and 16. Accordingly, the stress distribution of the new configuration is more desirable than the stress distribution of the old configuration, depicted in FIG. 14.

Equal stress gives a more efficient structure. It is desired to get maximum deflection at a prescribed load; local yield of material limits the load. Two stresses equal to one another provide maximum deflection at the yield stress of the material.

It will be realized that making the spring longer cannot practically be considered because of the constraints of the spacer height. The design here disclosed gives an effectively longer overall length within the limited spacer height.

The spring of the present invention is used in connection with a spacer (FIG. 9), comprising a number of ferrules 94 (FIGS. 10-13). The spacer can be formed of a number of materials having a suitably low neutron absorption cross section, preferably a zirconium alloy, such as Zircaloy-4. The spacer in one embodiment is square-shaped with a side length of about 5.25 inches (about 13.3 cm), and the ferrules are about 0.57 inches (about 16.2 mm) in outside diameter, with a wall thickness of about 0.02 inches (about 0.5 mm).

The ferrule of the preferred embodiment includes two upper stops 146, 148, and two lower stops 152, 154 extending inwardly into the ferrule 94. Preferably, the stops 146, 148, 152, 154 are formed by indenting portions of the ferrule wall to produce inwardly-arching structures.

As best seen in FIGS. 10-13, the fuel rods 155a, 155b are abutted against the stops 146, 148, 152, 154 to place the fuel rods 155a, 155b in a preferred position within the ferrule 94, such as a position coaxial with the ferrule. The force to maintain the fuel rods 155a, 155b, in contact with the stops 146, 148 152, 154 is provided by the spring 92a.

In order to provide such force, the spring 92 is mounted on ears 132, 134 of the ferrule 94. (See FIG. 12). The ears 132, 134 are defined by an E-shaped slot 158, formed in the wall of the ferrule 94. The upper and lower legs 162, 164 of the E-shaped slot 158 are shown in ferrule 94.

The middle leg 178 of the E-shaped slot 158 serves to define the ears 132, 134. Each of ears 132, 134 has an edge surface 135, 135', an inner surface 137, 137', and an outer surface 139, 139' (FIG. 20).

As seen in FIGS. 10 and 13, the tab 176 is curved outwardly from the circumference of the ferrule 136. As seen in FIG. 20, the spring 92 is attached to the ferrule 136 by slipping the spring over the upper and lower ears 132a, 134a of a first of the ferrules 94a.

The spring is retained in its position on the ears 132a, 134a by positioning the corresponding ears 132b, 134b (FIG. 20) of the next adjacent ferrule 94b in a butt-joint relationship with the tab and ears 176a, 132a, 134a of the first ferrule 94a, facing in the direction opposite that of the tab and ears 176b, 132b, 134b of the second ferrule 94b.

The corresponding ears 132a, 132b and 134a, 134b on the two ferrules 94a, 94b are thus configured with their edges 135, 135', adjacent, but without any overlapping, i.e., without substantial contact of, the inner and/or outer surfaces 137, 137', 139, 139'. To provide for this buttjoint contact, the width 179 of the tab 176 is less than the width 179' of the corresponding tab 86 (FIG. 7) of prior art ferrules.

As seen in FIG. 10, the tabs 176a, 176b are curved in opposite directions (e.g. concave and convex, respectively, when viewed from the interior of the first ferrule 94a), which results in a tendency to center the spring 92 on the tabs 176a, 176b. The ferrules are held in the position depicted, by welding, preferably at the top and bottom areas of the ferrules which are in contact. A peripheral band 180 surrounds and supports the plurality of ferrules (FIG. 9).

The spacer shown in FIG. 9 has a central region 181 where the ferrules are omitted. This space is used for moderator tubes. FIG. 17 shows the central region in more detail. Water rods W1 and W2 occupy the central region. With the spacer configuration of FIG. 9 there is an even number of ferrules; 72 ferrules. However, it is not possible to form pairs with all of these ferrules. FIG. 17 shows two ferrules, 94c and 94d, which are not paired with other ferrules.

As shown in FIGS. 10 and 11, the spring loads two adjacent fuel rods. If one rod is absent, the spring will no longer provide the required load on the remaining fuel rod.

In order to provide proper spring force for the unpaired ferrules 94c, 94d, restraints for the corresponding springs 92c, 92d are provided. As shown in FIG. 17, spacer support plates 184a, 184b are attached to the spacer in the region of each unpaired ferrule 94c, 94d. As best seen in FIG. 19, the plate 184 is provided with a central U-shaped member 190. This member defines two shoulder 191, 192. As seen in FIG. 17, members 191 and 192 bear against the respective water rods W1 and W2 in the central portion of the fuel bundle. Since one of these U-shaped members bears on the water rod pair equally and from opposite sides, the two water rods W1 and W2 are effectively forced apart.

This forcing of the water rods away from one another is opposed. Specifically it is opposed by springs 195 at water rod W1 and spring 196 at water rod W2. A positioning of the water rod by the spacer which is precisely analogous to that of the fuel rods occurs.

It can be seen that the U-shaped member 184 is provided with wing members 197, 198. These respective wing members form the points of attachment to ferrules adjacent the respective water rods.

It will be understood that with the placement of the water rods W1 and W2, some of the respective fuel rods will be lacking the normal off setting fuel rod on the opposite side of the disclosed spring. This being the case, plate 184 is provided with ears 134', 136' for supporting the springs 194 and 196 in a manner similar to the ears 132, 134 in a normal ferrule. The region between the ears 132', 134' is occupied by a backup tab 186. The tab 186 is bent outwardly to contact the exterior of a rod-contacting portion 106 of the spring 92c (FIG. 18). The backup tab 186 thus substitutes for the missing adjacent fuel rod, and provides a restraint on the spring 92c.

In light of the above description, a number of advantages of the present invention are apparent. The spring can be provided in a smaller space, such as that available with a rod-to-rod spacing 78' (FIG. 10) of between about 0.12 and 0.14 inches (about 3 to about 3.5 mm), and yet can produce the required force for fuel-rod loading, preferably about 2.5 pounds (about 1 kg). The present spring is more flexible than previous springs, and has a more advantageous distribution of stresses, with the mid-span stress being approximately equal to the end stress. The spring-and-spacer design provides for desirable coolant flow near the rod. The spring-and-spacer assembly provides for ease of construction. The spring is adaptable for use with unpaired ferrules by providing a plate with a backup tab.

A number of variations and modifications of the present invention will be apparent to those skilled in the art. The spring and/or spacer can be made of materials other than those discussed herein. The general spring and spring-and spacer assembly configuration can be used in connection with spacers having more or fewer fuel rod positions than those depicted herein. Various aspects of the disclosed design can be used independently of other aspects, for example, a spring can be provided with bend regions, but without the butt-joint configuration of the ferrule tabs.

Although the description of the present invention has included a description of a preferred embodiment and various modifications thereof, other modifications and variations will be apparent to those skilled in the art, the present invention being described in the following claims.

What is claimed is:

1. A loop spring for maintaining fuel rods in spaced apart relation in a fuel bundle spacer, said spacer including; first and second overlying spring supporting elements for supporting a spring, said spring supporting elements disposing said spring on opposite sides to and towards a ferrule for containing fuel rods, said spring elements of the type formed from a continuous elongated loop of spring material, said spring element in the unstressed state having said loop defining an upper C-shaped end in said loop for surrounding and being supported from said first spring support member from said spacer; a lower C-shaped end in said loop for surrounding and being supported from a second and underlying spacer member; paired spring leg members on either side of said loop for closing said loop between said C-shaped ends; said paired spring leg member further defining medially thereof a convex and outwardly disposed arch shaped rod contacting portion, said rod contacting portions on each of said paired spring leg members being medially located in said spring leg members between said upper and lower C-shaped sections; the improvement in said loop spring member comprising:

two inwardly disposed U-shaped bends formed in either spring leg, said U-shaped bends being joined to and on either side of said convex and outwardly disposed arch shaped rod contacting portion, each said U-shaped bend being immediately adjacent said convex and outwardly disposed arch shaped rod contacting portion at one end and attached to said spring leg at the other end, each rod containing portion and said U-shaped bend on each side of said rod contacting portion defining offsets in the unstressed state of said spring from paired planes on each side of said loop spring, each said paired planes generally defined by and including the substantially linear portion of said paired spring leg members beginning at said C-shaped ends and including said paired spring leg members and ending at the beginning of said U-shaped members, said plane being defined across said rod contacting portion and said U-shaped bends on either side of said rod contacting portion so that said rod contacting portion is offset on one side of said plane away from the opposite side of said spring and said U-shaped bends on either side of said rod contacting portion are offset on the other side of said plane to and toward the center of said loop spring whereby said U-shaped bends in the stressed state of said spring expand the effective length of said spring and equalize bending stresses between said two convex and outwardly disposed rod contacting portions and said C-shaped ends.

2. The invention of claim 1 and wherein said rods separated by said spacer are confined in a 9×9 matrix.

3. The invention of claim 1 and including a first fuel rod ferrule for containing a fuel rod on one side of said spring and a second fuel rod ferrule for containing a second fuel rod on the opposite side of said spring.

4. A spacer assembly for maintaining a matrix of fuel rods in spaced apart relation between upper and lower tie plates said spacer comprising:

a matrix of side by side ferrules each said ferrule corresponding to a corresponding matrix position of said fuel rods, said ferrules configured for encircling said fuel rods at said spacer;

each said ferrule defining four inwardly disposed fuel rod contacting points said fuel rod contacting points for abutting fuel rods urged against said points;

paired said ferrules defining upper and lower spring support points for supporting said spring between said ferrules;

at least one loop spring for maintaining fuel rods disposed in adjacent ferrules in spaced apart relation; said loop spring formed from a continuous elongated loop of spring material; said spring material in the unstressed state being of the type having an upper C-shaped end in said loop for surrounding and being supported from a first spacer support member; a lower C-shaped end in said loop for surrounding and being supported from a lower end and second spacer supporting member; paired spring leg members connecting said top and bottom C-shaped ends to form said elongated loop shaped spring member into a continuous loop suspended from said spring support members; said paired spring leg members each further defining medially thereof a convex and outwardly disposed arch shaped rod contacting portion, said rod contacting portion being medially located in said spring members between the upper and lower C-shaped members;

said spring leg member further defining two inwardly disposed concave U-shaped bends formed in each spring leg, said concave U-shaped bends being immediately joined to and on either side of said convex and outwardly disposed arch shaped rod contacting portion at one end and attached to said spring leg portion at the other end, each rod contacting portion and said U-shaped bend on each side of said rod contacting portion defining offsets in the unstressed state of said spring from paired planes on each side of said loop spring, each said paired planes generally defined by and including the substantially linear portion of said paired spring leg members beginning at said C-shaped ends and including said paired spring leg members and ending at the beginning of said U-shaped members, said plane being defined across said rod contacting portion and said U-shaped bends on either side of said rod contacting portion so that said rod contacting portion is offset on one side of said plane away from the opposite side of said spring and said U-shaped bends on either side of said rod contacting portion are offset on the other side of said plane to and toward the center of said loop spring whereby said U-shaped bends in the stressed state of said spring expand the effective length of said spring and equalize the bending stresses between said two convex and outwardly disposed rod contacting portions and said C-shaped ends.

5. The spacer assembly of claim 4 and wherein said spring extends at one spring leg member into a first ferrule and at a second spring leg member into a second ferrule.

* * * * *

UNITED STATES PATENT AND TRADEMARK OFFICE
CERTIFICATE OF CORRECTION

PATENT NO. : 5,002,726

DATED : March 26, 1991

INVENTOR(S) : Eric B. Johansson, et al.

It is certified that error appears in the above-identified patent and that said Letters Patent is hereby corrected as shown below:

On the title page, under item [19], after "Johansson", insert --et al--; and in item [75], after "Eric B. Johansson", delete the "," (comma) and insert the following:

--; Gerald M. Latter; and Michael V. Curulla, all of--.

Signed and Sealed this

Eleventh Day of August, 1992

Attest:

DOUGLAS B. COMER

*Attesting Officer*   *Acting Commissioner of Patents and Trademarks*